United States Patent
Schilder

(10) Patent No.: US 9,758,054 B2
(45) Date of Patent: Sep. 12, 2017

(54) DEHUMIDIFICATION CHAMBER FOR BATTERY SYSTEMS AND RELATED METHODS

(71) Applicant: GM GLOBAL TECHNOLOGY OPERATIONS LLC, Detroit, MI (US)

(72) Inventor: Boris Schilder, Frankfurt am Main (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 397 days.

(21) Appl. No.: 14/284,206

(22) Filed: May 21, 2014

(65) Prior Publication Data

US 2015/0336470 A1 Nov. 26, 2015

(51) Int. Cl.
| | |
|---|---|
| H01M 8/04 | (2016.01) |
| B60L 11/18 | (2006.01) |
| H01M 10/6561 | (2014.01) |
| H01M 10/613 | (2014.01) |
| H01M 10/625 | (2014.01) |

(52) U.S. Cl.
CPC ....... *B60L 11/1874* (2013.01); *H01M 10/613* (2015.04); *H01M 10/6561* (2015.04); *H01M 10/625* (2015.04)

(58) Field of Classification Search
CPC . B60L 11/1874; B60L 11/18; H01M 8/04492; H01M 8/045; H01M 8/04507; H01M 8/04514
See application file for complete search history.

(56) References Cited

U.S. PATENT DOCUMENTS

| | | | | |
|---|---|---|---|---|
| 6,205,805 | B1 * | 3/2001 | Takahashi | B60H 3/024 |
| | | | | 62/271 |
| 2012/0305662 | A1 * | 12/2012 | Miyano | H02J 7/00 |
| | | | | 236/44 C |
| 2014/0208775 | A1 * | 7/2014 | Styles | F25B 30/02 |
| | | | | 62/56 |

FOREIGN PATENT DOCUMENTS

| | | | | |
|---|---|---|---|---|
| CN | 101633306 | | 1/2010 | |
| CN | 102806839 | | 12/2012 | |
| JP | 2005009022 A | * | 1/2013 | ............ H01M 8/04 |

OTHER PUBLICATIONS

CN102806839—Machine Translation.
CN101633306—Machine Translation.

* cited by examiner

*Primary Examiner* — Mark F Huff
*Assistant Examiner* — Monique Wills
(74) *Attorney, Agent, or Firm* — Phillips Ryther & Winchester; Jared L. Cherry

(57) ABSTRACT

The present disclosure relates to reducing formation of condensate in a battery compartment using a dehumidification chamber in which air is conditioned prior to entering the battery compartment. In one embodiment, a cooling system may be configured to produce a flow of coolant. The dehumidification chamber configured to receive a flow of ambient air from an environment. A heat transfer device may be in thermal communication with the dehumidification chamber and configured to receive the flow of coolant. The heat transfer device may produce a flow of conditioned air from a thermal interaction between the flow of coolant and the flow of ambient air. The battery compartment may house a battery and may receive the flow of conditioned air and the flow of coolant. In some embodiments, the flow of coolant (Continued)

may pass through the heat transfer device before the flow of coolant passes through the battery compartment.

11 Claims, 3 Drawing Sheets

DEHUMIDIFICATION CHAMBER FOR BATTERY SYSTEMS AND RELATED METHODS

TECHNICAL FIELD

This disclosure relates to systems and methods to reduce or prevent formation of condensate in a battery compartment by providing a dehumidification chamber in which air is conditioned prior to entering the battery compartment.

BACKGROUND

Passenger vehicles often include electric batteries for operating a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system may be used to power electric drivetrain components of the vehicle (e.g., electric drive motors and the like). Further, the HV battery system may power a compressor and/or a heater used in a climate control system for vehicle cabin.

Various battery systems may include vents that allow ambient air to enter portions of a battery system. Water carried by the ambient air may condense within the battery system. Condensate inside the battery system may cause corrosion and/or problems with electrical circuits in the battery system. Corrosion and/or electrical problems created by condensate may result in battery system inefficiencies, degradation, permanent damage and/or a shortened usable lifespan of the battery system.

SUMMARY

The present disclosure relates to reducing formation of condensate in a battery compartment using a dehumidification chamber in which air is conditioned prior to entering the battery compartment. In one embodiment, a cooling system may be configured to produce a flow of coolant and a dehumidification chamber may be configured to receive a flow of ambient air from an environment. The flow of ambient air may refer to movement of water vapor by either movement of air containing water vapor or through diffusion (e.g., a difference in water vapor concentration between inside and outside of the dehumidification chamber). In some embodiments, a drying agent may be disposed in the dehumidification chamber. The drying agent may be configured to absorb water from the flow of ambient air.

A heat transfer device may be in thermal communication with the dehumidification chamber and configured to receive the flow of coolant. The heat transfer device may produce a flow of conditioned air from a thermal interaction between the flow of coolant and the flow of ambient air. The flow of ambient air may be generated by a pressure difference between the environment and the dehumidification chamber. In various embodiments, the pressure difference may be created by a fan or by a temperature difference between the environment and the temperature in the dehumidification chamber. In some instances, even without a flow of air, water vapor may enter the battery due to diffusion (i.e., a difference in vapor concentration inside and outside of a battery compartment).

The battery compartment may house a battery and may receive the flow of conditioned air and the flow of coolant. In some embodiments, the flow of coolant may pass through the heat transfer device before the flow of coolant passes through the battery compartment. In other embodiments, the flow of coolant may pass through the heat transfer device after the flow of coolant passes through the battery. The flow of coolant may cool the battery. The cooling system may, in some embodiments, maintain a first temperature in the dehumidification chamber below a second temperature in the battery compartment while the battery operates in a steady-state condition. In one specific embodiment, the cooling system may maintain a temperature of the battery between about 5° C. and about 35° C. In other embodiments, temperature ranges extending beyond about 5° C. and about 35° C. are also contemplated. For example, in various embodiments, the temperature range may extend between about 2° C. and about 45°. The battery may comprise a lithium-ion battery or other type of battery.

Some embodiments may include a vent configured to permit a flow of ambient air from an environment to enter the dehumidification chamber and configured to permit condensate formed in the dehumidification chamber to drain. Further, the vent may be configured to allow condensate to drain from the dehumidification chamber under the influence of gravity. In some embodiments, a membrane may be disposed over the vent. The membrane may be permeable to air and/or water, but may prevent debris and other objects from entering the dehumidification chamber.

An air-permeable membrane may be disposed between the dehumidification chamber and the battery compartment, the air permeable membrane configured to permit the flow of conditioned air to pass between the dehumidification chamber and the battery compartment. In some embodiments, the air-permeable membrane is impermeable to liquid.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments.

It will also be readily understood that the components of certain embodiments, as generally described and illustrated in the figures herein, could be arranged and designed in a wide variety of different configurations.

Figure 1:
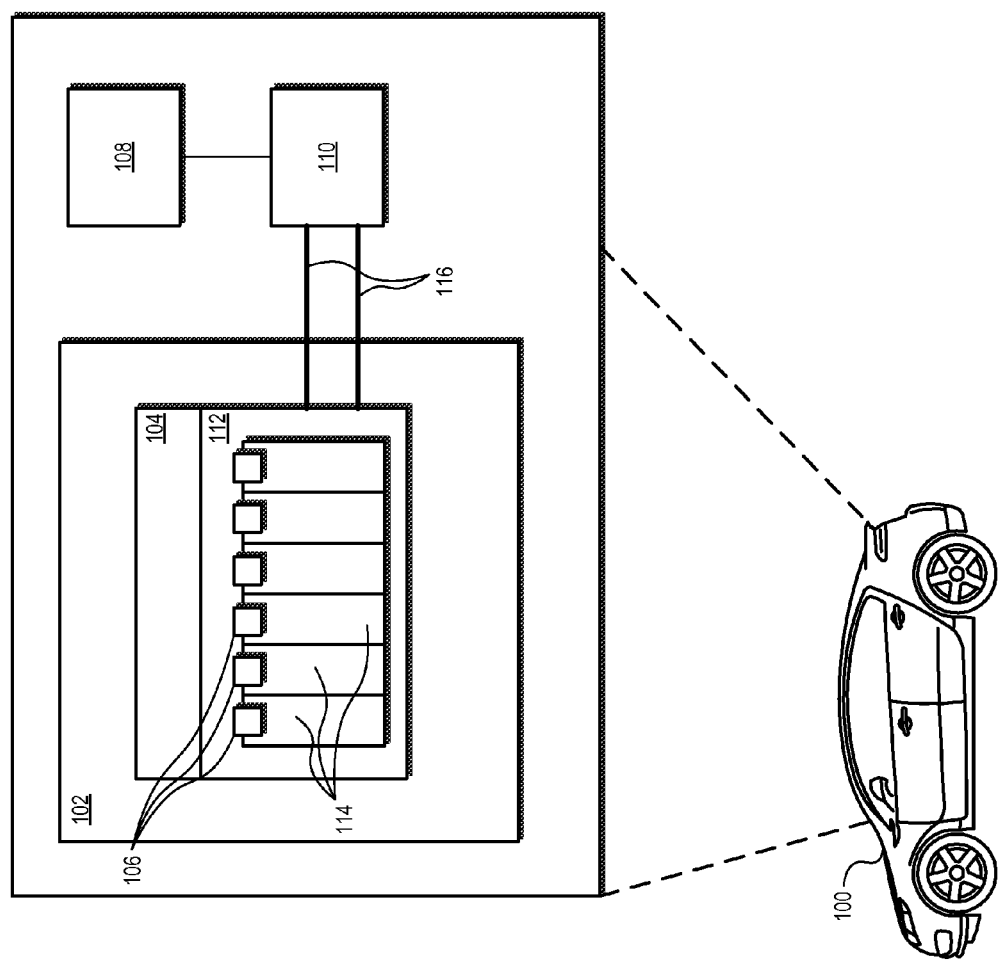
FIG. 1 illustrates a block diagram of an exemplary battery system in a vehicle consistent with the present disclosure.

FIG. 1 illustrates a block diagram of an exemplary battery system 102 in a vehicle 100 consistent with embodiments disclosed herein. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, an FC drivetrain, and/or any other type of drivetrain suitable for incorporating the systems and methods disclosed herein. The vehicle 100 may include a battery system 102 that, in certain embodiments, may be an HV battery system. The HV battery system may be used to power electric drivetrain components (e.g., as in an electric, hybrid, or FC power system) and a vehicle cabin climate control system, which may include a heater and/or compressor. In further embodiments, the battery system 102 may be a low voltage battery (e.g., a lead-acid 12V automotive battery) and may be configured to supply electric energy to a variety of vehicle 100 systems including, for example, vehicle starter systems (e.g., a starter motor), lighting systems, ignition systems, and/or the like. Still further, in some embodiments the battery system may be configured to operate in mild-hybrid applications and may have a mid-range voltage (e.g., about 42 volts).

A cooling system 110 may be configured to generate a flow of coolant (e.g. water-glycol, dielectric liquid, refrigerant, air) that is used to maintain a temperature of the battery system 102 within a specified a range. The cooling system 110 may be in fluid communication with the battery system 102 through one or more coolant lines 116. In certain embodiments, a coolant may absorb heat from battery system 102 as it flows through the battery system 102. The heated coolant may flow back to the cooling system 110, where the heat absorbed by the coolant may be transferred to the environment. As discussed in greater detail below, the cooling system 110 may further be used in connection with a dehumidification system (such as the system illustrated in FIG. 2) that conditions ambient air prior to entering the battery system 102.

The battery system 102 may include a battery control system 104. The battery control system 104 may be configured to monitor and control certain operations of the battery system 102. For example, the battery control system 104 may be configured to monitor and control charging and discharging operations of the battery system 102. In certain embodiments, the battery control system 104 may be communicatively coupled with one or more sensors 106 (e.g., voltage sensors, current sensors, temperature sensors, humidity sensors and/or the like, etc.) and/or other systems configured to enable the battery control system 104 to monitor and control operations of the battery system 102.

Information from sensors 106 may be used by the control system 104 to operate the cooling system 110 to condition air from the environment that flows into the battery system 102. Temperature and/or humidity sensors 106 may provide data to the battery control system 104, which in turn may be configured to monitor the humidity within battery system 102 and to appropriately operate the cooling system 110 to dehumidify environmental air entering the battery system 102 to prevent condensation within the battery system 102.

The battery control system 104 may further be configured to provide information to and/or receive information from other systems included in the vehicle 100. For example, the battery control system 104 may be communicatively coupled with an internal vehicle computer system 108 and/or the cooling system 110. In certain embodiments, the battery control system 104 may be configured, at least in part, to provide information regarding the battery system 102 to a user of the vehicle 100, vehicle computer system 108, and/or the cooling system 110. Such information may include, for example, battery state of charge information, battery operating time information, battery operating temperature information, and/or any other information regarding the battery system 102.

The battery system 102 may include one or more battery packs 112 suitably sized to provide electrical power to the vehicle 100. Each battery pack 112 may include one or more subdivisions 114. The subdivisions 114 may comprise sub-packs, each of which may comprise one or more battery cells utilizing any suitable battery technology. Suitable battery technologies may include, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), nickel manganese cobalt ("NMC"), lithium iron phosphate ("LFP"), lithium manganese oxide ("LMO"), and/or other suitable battery technologies and combinations thereof (e.g., mixed-chemistry battery technologies).

Each subdivision 114 may be associated with a sensor 106 configured to measure one or more parameters (e.g., voltage, current, impedance, temperature, etc.) associated with each battery subdivision 114. Although FIG. 1 illustrates separate sensors 106 associated with each battery section 114, in some embodiments a sensor configured to measure various parameters associated with a plurality of subdivisions 114 may also be utilized. The parameters measured by sensor 106 may be provided to battery control system 104. Using the electrical parameters, battery control system 104 and/or any other suitable system may coordinate the operation of battery system 102.

In one specific embodiment, the battery system 102 may comprise a Li-Ion battery configured to operate at a temperature of less than 35° C. As battery technology evolves higher temperature ranges may become practicable for Li-Ion battery systems. For example, it is contemplated that certain embodiments may be configured to operate at a temperature higher than 35° C.

In some situations, the battery system 102 or parts of it (e.g., coolant piping) may be at a lower temperature level than environmental air. The vapor capacity of the air within the battery system 102 may be lower than the environmental vapor density, since vapor capacity is a function of temperature. In such a circumstance, ambient air taken into the battery system 102 may experience a reduction in its vapor capacity and condensate may form in proximity to the battery. As is discussed in greater detail in FIG. 2, a dehumidification chamber may be used to condition air entering a battery compartment and to reduce or eliminate formation of condensate in proximity to the battery system 102.

Figure 2:
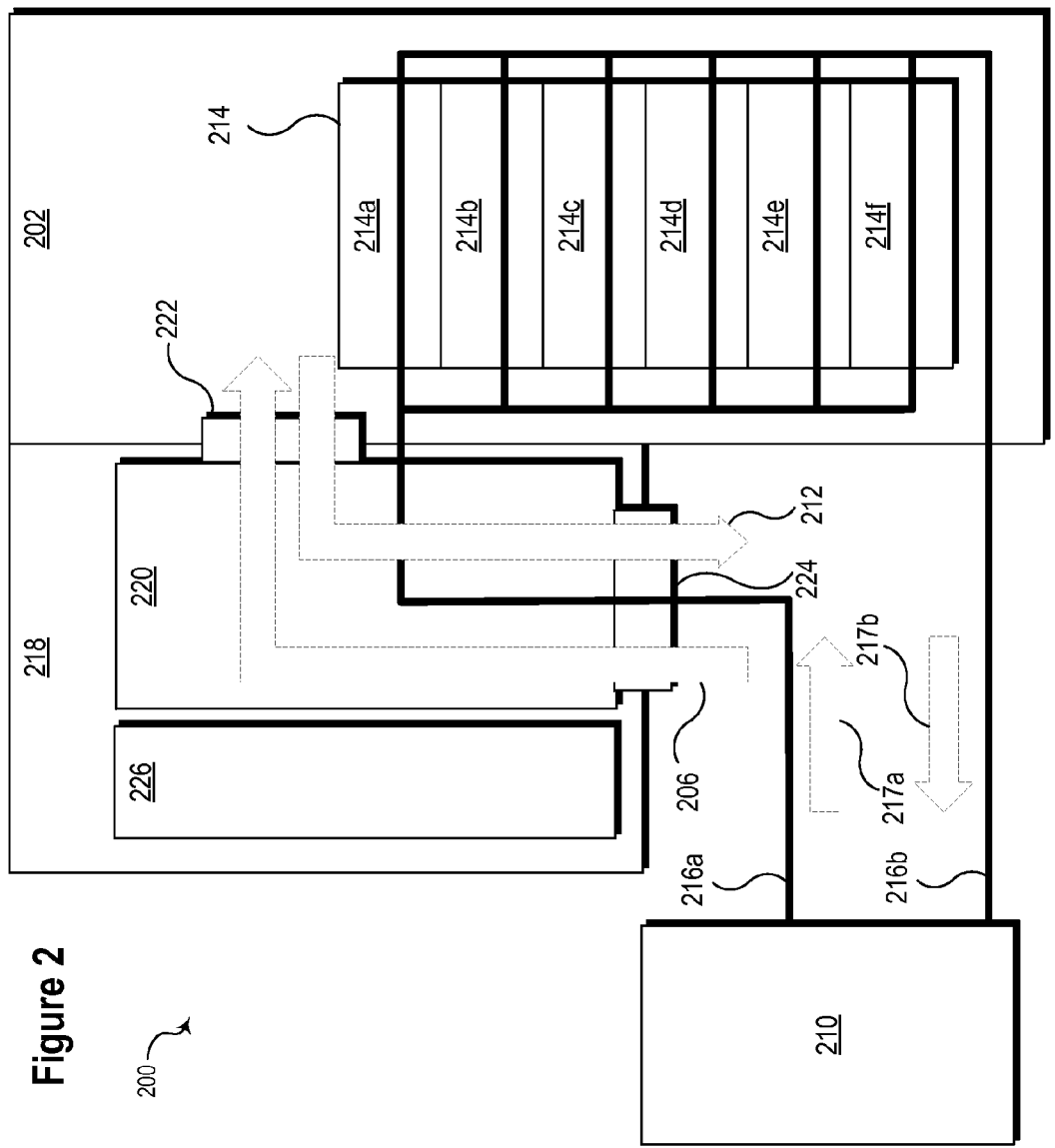
FIG. 2 illustrates a functional block diagram of a system including a dehumidification chamber system consistent with the present disclosure.

FIG. 2 illustrates a functional block diagram of a system 200 including a dehumidification chamber 218 system consistent with the present disclosure. A battery compartment 202 may house a battery 214 including a plurality of battery subdivisions 214a-214f electrically arranged in series. In some embodiments, battery subdivisions 214a-214f may each include a plurality of battery cells. A cooling system 210 may provide a closed-loop path through which coolant may flow through system 200. A temperature of a battery 214 may be maintained within a temperature range by controlling the flow of coolant delivered to the battery 214 by the cooling system 210.

Coolant may flow to system 200 through coolant line 216a (as indicated by arrow 217a) and may flow from system 200 through coolant line 216b (as indicated by arrow 217b). In the illustrated embodiment, coolant traveling through coolant line 216a flows into dehumidification chamber 218 before flowing into battery compartment 202. In the illustrated embodiment, coolant line 216 branches in battery compartment 202 and flows in a plurality of parallel channels through the plurality of battery subdivisions 214a-214f. In alternative embodiments, coolant may flow serially through the plurality of battery subdivisions 214a-214f. Further, in alternative embodiments, the direction of the flow of coolant may be reversed (i.e., the direction of the arrows 217a, 217b may be reversed), such that the flow of coolant enters the battery compartment 202 before entering the dehumidification chamber 218. Still further, in various embodiments the coolant line 216b may also exit the battery compartment 202 through the dehumidification chamber 218.

A heat exchanger 220 may facilitate the transfer of heat from ambient air in dehumidification chamber 218. An incoming flow of ambient air 206 may enter the dehumidification chamber 218 through an aperture 224. The incoming flow of ambient air 206 may be generated by convection in some embodiments, while active components may be used in other embodiments to generate the flow of ambient air 206. The flow of ambient air 206 may enter the dehumidification chamber 218 through the aperture 224 and may pass through the heat exchanger 220. In various embodiments, a membrane (not shown) may be partially or fully disposed across the aperture 224. The membrane may, in some embodiments, comprise a liquid permeable membrane. In other embodiments, the aperture 224 may be replaced by a porous material that is configured to permit the flow of ambient air 206 to enter the dehumidification chamber 218.

The flow of coolant through coolant line 216a may cool the incoming flow of ambient air 206. Cooling the incoming flow of ambient air 206 may reduce the water vapor capacity of the incoming flow of ambient air 206. If the temperature of the incoming flow of ambient air 206 drops below the dew point, condensation may occur. Accordingly, any excess water carried by the incoming flow of ambient air 206 may condense to liquid water and form condensate. Condensate formed in the dehumidification chamber 218 may drain from dehumidification chamber 218 through the aperture 224.

The dehumidification chamber 218 may have a lower temperature than the battery compartment 202 because coolant from the cooling system 210 passes through the dehumidification chamber 218 before passing through battery compartment 202. Further, the battery compartment 202 may maintain a higher temperature than dehumidification chamber 218 because of operation of battery 214, which may generate heat as a result of storing and releasing electrical energy through electrochemical reactions. As a result, condensate may form, if at all, in the dehumidification chamber 218 rather than in battery compartment 202.

An air permeable membrane 222 may separate dehumidification chamber 218 from battery compartment 202. The air permeable membrane 222 may allow conditioned air (e.g., cooled and dehumidified air) that has been cooled by the heat exchanger 220 to pass from the dehumidification chamber 218 to the battery compartment 202. In one embodiment, the air permeable membrane 222 may be formed of Polytetrafluoroethylene, which is air and vapor permeable but liquid impermeable. In other embodiments, alternative materials may be used. Further, such materials may be liquid permeable or liquid impermeable. In other embodiments, membrane 222 may be omitted, and an aperture may permit conditioned air to pass from the dehumidification chamber 218 to the battery compartment 202. An outgoing flow of air 212 may exit from battery component through the air permeable membrane 222 and into the dehumidification chamber 218.

In some embodiments, a drying agent 226 may be disposed in dehumidification chamber 218 to further aid in the dehumidification of the incoming flow of ambient air 206. The drying agent 226 may comprise silica gel or other hygroscopic substance (e.g., zinc chloride and calcium chloride, as well as potassium hydroxide and sodium hydroxide) or any other type of desiccant. In the illustrated embodiment, the dehumidification chamber 218 includes two techniques for dehumidifying the incoming flow of ambient air 206, namely the drying agent 226 and the coolant flow 217a. In other embodiments, only one dehumidification technique may be used. The drying agent 226 may be periodically replaced or regenerated.

Figure 3:
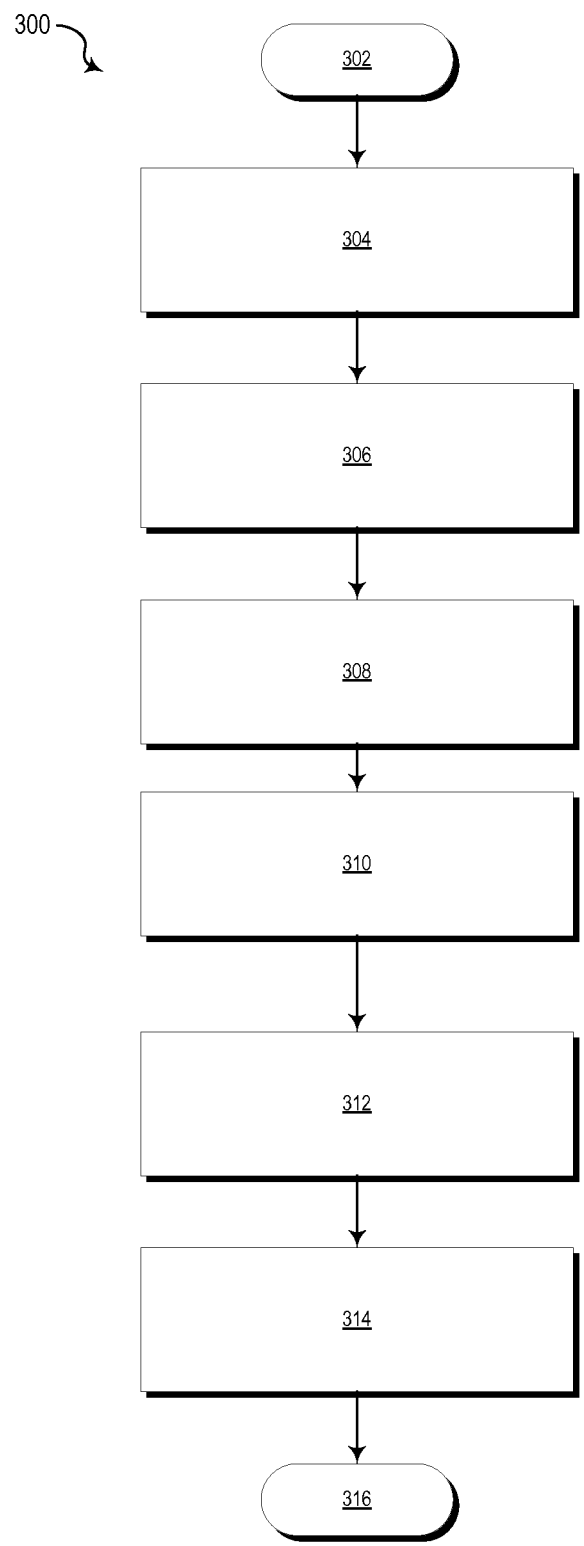
FIG. 3 illustrates a flow chart of a method of treating environmental air in a dehumidification chamber of a battery system consistent with the present disclosure.

FIG. 3 illustrates a flow chart of a method 300 of treating environmental air in a dehumidification chamber of a battery system consistent with the present disclosure, which may begin at 302. At 304, a dehumidification chamber may be provided. In some embodiments, the dehumidification chamber may be similar to the dehumidification chamber included in the battery system described above and illustrated in connection with FIG. 2.

At 306, a flow of ambient air may be received through an aperture and into the dehumidification chamber. In some embodiments, the flow of ambient air may be generated passively, using, for example, a pressure difference between the environment and the dehumidification chamber. The pressure difference may be attributable to a difference in temperature between the dehumidification chamber and the environment. The difference in pressure may cause air to flow from the environment into or out of the dehumidification chamber. Further, air flow may be induced by changes in atmospheric pressure as a vehicle's elevation increases or decreases. For example, as the elevation of a vehicle decreases, the atmospheric pressure increases. As a result of the increased atmospheric pressure, air may flow into the dehumidification chamber. The same process may occur in reverse as the elevation of a vehicle increases. In various embodiments, the flow of ambient air may be generated passively, while in other embodiments, the flow of ambient air may be generated actively using an air circulation device (e.g., a fan), while in other embodiments the flow of ambient air may be generated passively.

At 308, a flow of coolant may be generated using a cooling system. In various embodiments, the cooling system may be embodied as a closed-loop refrigeration system. At 310, a flow of conditioned air may be produced in the dehumidification chamber by a thermal interaction between the flow of coolant and the flow of ambient air. In one embodiment, the coolant may flow through a heat exchanger disposed in the dehumidification chamber, thus cooling the surrounding air in the dehumidification chamber. In various embodiments the heat exchanger may be embodied as a liquid-to-air heat exchanger that includes a plurality of fins to provide a large surface area. The coolant may flow through the liquid-to-air heat exchanger and may cool the air surrounding the heat exchanger as the air interacts thermally with the plurality of fins. In another example, an aluminum foam may be used in connection with the heat exchanger to increase the surface area for thermal interaction between the heat exchanger and the air in the dehumidification chamber. As a result of the cooling of the air in the dehumidification chamber, the vapor capacity of the air may be reduced. Condensate may form in the dehumidification chamber if the temperature of the conditioned air falls below the dew point. In some embodiments, the condensate may drain from the dehumidification chamber under the influence of gravity. In one particular embodiment, condensate may drain from the vent through which the flow of ambient air enters the dehumidification chamber. In some embodiments, a membrane may be disposed over the vent. The membrane may be permeable to air and/or water, but may prevent debris and other objects from entering the dehumidification chamber.

At 312, the flow of conditioned air may pass to a battery compartment through an air-permeable membrane. The air-permeable membrane may, in some embodiments, be impermeable to liquid. In some embodiments, the temperature in the battery compartment may be greater than the temperature in the dehumidification chamber. The higher temperature in the battery chamber results in an increased vapor capacity. Thus formation of condensate in the battery chamber may be reduced or eliminated in the battery chamber. The higher temperature in the battery chamber may result from heat generated by a battery disposed with the battery chamber. The battery may generate heat as a result of storing and releasing electrical energy through electrochemical reactions. In some embodiments, the higher temperature in the battery compartment may be maintained by causing the flow of coolant to pass first through the battery dehumidification chamber and subsequently through the battery chamber. Of course, in alternative embodiments, the flow of coolant may first pass through the battery chamber and subsequently through the dehumidification chamber.

At 314, the flow of coolant may cool the battery housed in the battery compartment. In various embodiments, the flow of coolant may be configured to maintain the battery temperature within a predetermined range. In one specific embodiment, the predetermined range comprises between about 5° C. and about 45° C.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to reduce formation of condensate in a battery compartment, the system comprising:
   a cooling system configured to produce a flow of coolant;
   a dehumidification chamber, comprising:
      a vent configured to:
         permit a flow of ambient air from an environment to enter the dehumidification chamber; and
         permit condensate formed in the dehumidification chamber to drain from the dehumidification chamber; and
      a heat exchanger configured to receive the flow of coolant from the cooling system and configured to produce a flow of conditioned air from a thermal interaction between the flow of coolant and the flow of ambient air; and
   a battery compartment configured to house a battery and further configured to receive the flow of conditioned air and the flow of coolant, the flow of coolant further configured to cool the battery;
   wherein the flow of coolant comprises a closed-loop path through the dehumidification chamber and the battery compartment.

2. The system of claim 1, wherein the flow of coolant passes through the heat exchanger before the flow of coolant passes to the battery compartment.

3. The system of claim 1, wherein the vent is configured to allow the condensate to drain under the influence of gravity.

4. The system of claim 1, wherein the flow of ambient air is generated by a pressure difference between the environment and the dehumidification chamber.

5. The system of claim 1, further comprising an air-permeable membrane disposed between the dehumidification chamber and the battery compartment, the air permeable membrane configured to permit the flow of conditioned air to pass between the dehumidification chamber and the battery compartment.

6. The system of claim 4, wherein the air-permeable membrane is impermeable to liquid.

7. The system of claim 1, further comprising a drying agent disposed in the dehumidification chamber, the drying agent configured to absorb water from the flow of ambient air.

8. The system of claim 1, wherein the cooling system is further configured to maintain a first temperature in the dehumidification chamber below a second temperature in the battery compartment.

9. The system of claim 7, wherein the cooling system is further configured to maintain a third temperature of the battery between about 5° C. and about 35° C.

10. The system of claim 1, wherein the battery comprises a lithium-ion battery.

11. A system to reduce formation of condensate in a battery compartment, comprising:
    a cooling system configured to produce a flow of coolant in a closed-loop;
    a dehumidification chamber configured to receive a flow of ambient air from an environment;
    a heat transfer device in thermal communication with the dehumidification chamber and configured to receive the flow of coolant, the heat transfer device further configured to produce a flow of conditioned air from a thermal interaction between the flow of coolant and the flow of ambient air;
    a battery compartment configured to house a battery and configured to receive the flow of conditioned air and the flow of coolant, the flow of coolant configured to cool the battery; and
    wherein the flow of coolant in the closed-loop passes through the heat transfer device before the flow of coolant passes through the battery compartment.

* * * * *